Jan. 7, 1969 C. P. TROEMEL ET AL 3,420,104
TEMPERATURE MEASURING APPARATUS USING SEMICONDUCTOR JUNCTION
Filed May 26, 1966

ZENER DIODE CHARACTERISTIC

INVENTORS C. P. TROEMEL
E. H. WEBER, JR.
BY R. B. Andis
ATTORNEY

United States Patent Office

3,420,104
Patented Jan. 7, 1969

3,420,104
TEMPERATURE MEASURING APPARATUS
USING SEMICONDUCTOR JUNCTION
Clarence P. Troemel, Middlesex, and Edward H. Weber, Jr., Madison Township, Middlesex County, N.J., assignors to Bell Telephone Laboratories, Incorporated, Murray Hill, Berkeley Heights, N.J., a corporation of New York
Filed May 26, 1966, Ser. No. 553,152
U.S. Cl. 73—362                1 Claim
Int. Cl. G01k 5/18

ABSTRACT OF THE DISCLOSURE

A temperature measuring bridge having a sensing leg containing a Zener diode back-biased into its breakdown region. Two of the other legs are joined by a potentiometer across which is connected a temperature stable voltage-regulating breakdown diode device.

---

This invention relates to the electrical measurement of temperature, specifically where a semiconductor is used as the temperature sensing element.

For many decades temperature has been electrically measured and remotely indicated by means of thermocouples and various resistance elements. Neither of these methods has always been satisfactory, however, for temperatures in the range of human environment. The thermocouple requires the maintenance of a temperature controlled reference junction, commonly in ice water, and every junction besides the sensing junction which is not at the reference temperature is a potential source of error. The developed voltage is in the order of a few millivolts per one hundred centigrade degrees, and a potentiometer is normally adjusted to balance the developed voltage against a reference source, thereby drawing no current through the lines or the couples which might introduce an error voltage component into the reading.

The temperature coefficient of resistivity of the various resistance elements used for temperature measurement is so low, under 0.5 percent per centigrade degree, as to require considerable care and amplification to obtain a satisfactory indication of temperature in this range.

With the advent of the semiconductor, the problems appeared to be solved. It is well known that the resistivity of semiconductor materials changes more rapidly and predictably with temperature. Several useful circuits have been designed to measure the voltage developed across a forward biased transistor junction or diode as a measure of temperature. There remain, however, two important disadvantages: first, neither the voltage across the junction nor the current through the device is a linear function of temperature. Consequently, either a special nonlinear scale must be calibrated for each circuit, with a resulting loss of resolution in the compressed areas, or special linearity correction circuitry must be devised. If the temperature sensing element is to be used in a servo link with proportional control, considerable difficulty can be experienced in matching the curve of the element output to that of the control circuit.

Second, in contrast to a thermocouple which generates its own voltage, the semiconductor junction is merely a temperature variable impedance which must be energized by an external current source in order to develop a temperature indicating voltage. As a result, small changes in the source voltage seriously affect the precision of indicated temperature.

Circuits which use a thermistor as a temperature sensing element suffer even more from nonlinearity and poor source regulation as well as from the effects of self-heating.

An object of this invention is to provide improved simple and inexpensive electrical means of measuring temperatures accurately in the human environment range.

A further object is to provide simple means for producing an electrical output which is linear with temperature.

According to our invention, an output voltage which is linear with temperature is obtained across a semiconductor junction operating in the reverse breakdown voltage range. In a particularly advantageous embodiment, a Zener diode which is insensitive to temperature forms the reference leg of a bridge circuit and an ordinary Zener diode having a positive temperature characteristic forms the temperature sensing leg. Both Zener diodes are operated in their reverse breakdown voltage ranges, that is, in their voltage regulating modes. Additional resistance is added to one leg to create the added advantage of insensitivity to supply voltage variations.

The details of the invention and the manner in which its objects and advantages can best be achieved may be more fully understood from a consideration of the following description and drawings, in which.

Figure 1:
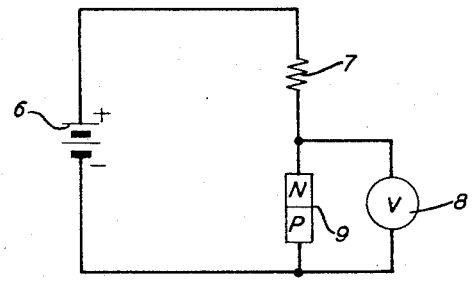
FIG. 1 is a schematic representation of the invention in its simplest form.
Figure 2:
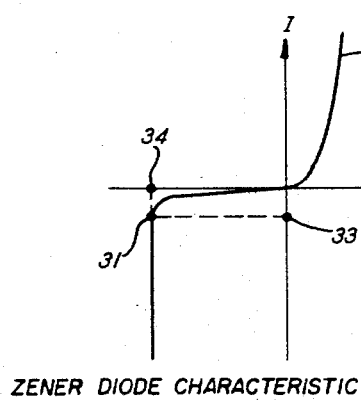
FIG. 2 is a plot of the voltage versus current characteristic of a typical semiconductor junction.

According to the simplest embodiment of the invention as presented in FIG. 1, a semiconductor junction 9 is connected across a battery 6 through a current limiting resistor 7. A voltmeter 8 having a scale with high resolution is connected to measure the voltage drop directly across the semiconductor junction. The junction is back biased; that is, it is poled in the direction that normally presents a high impedance to the flow of current for impressed voltages below a critical magnitude. In this application it has a relatively low impedance however, because it is operated in the reverse breakdown voltage range as illustrated by a point 31 on the lower left-hand section of curve 32 in FIG. 2. That curve is a plot of current against voltage for a typical semiconductor junction. Operating point 31 has a current value 33 and a voltage value 34, both negative. It is chosen to be on the near-vertical portion of the curve, that is, in the reverse breakdown voltage range, and close enough to the voltage axis so that the product of the voltage 34 and current 33 is less than the rated maximum allowable junction dissipation. In fact, it is well to keep the current 33 as close to the voltage axis as possible and still be on the vertical portion of the curve in order to minimize the amount of self-heating of the junction. To provide operation of the junction at point 31, the voltage of battery 6 and the resistance of resistor 7 are chosen by the formula $$I = \frac{E-V}{R}$$

where I is the value 33 of the current through the junction, V is the value 34 of the voltage across the junction, E is the battery voltage, and R is the resistance of current limiting resistor 7. The value R should be very large compared to the dynamic resistance of the junction in this range, that is, the reciprocal of the slope of the curve, to make the source virtually constant current.

Figure 3:
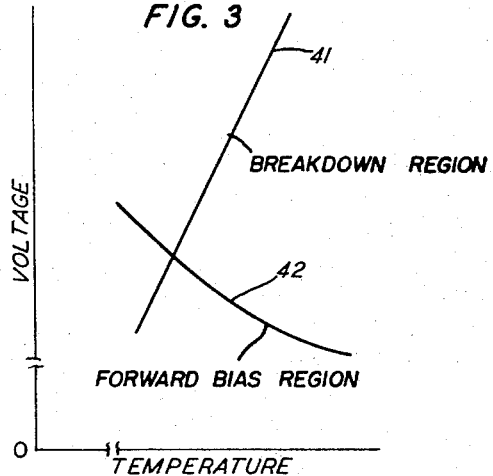
FIG. 3 is a plot of junction voltage versus temperature for both a forward biased and a back biased junction.

The change in voltage with respect to temperature is illustrated in FIG. 3. Curve 41 is an amplified portion of the curve of reverse junction breakdown voltage against junction temperature at a constant current, and curve 42 is an amplified portion of a similar curve for forward junction voltage, as used in the prior art. It can readily be seen that curve 41 is a straight line, definable by two points, while curve 42 is not. In addition, curve 41 changes much more rapidly with temperature. The voltage across junction 9 as measured by meter 8 is therefore linear with temperature and is substantially higher than the voltage across a forward biased junction. Since the voltage across the junction is in the order of several volts and changes in the order of millivolts per centigrade degree the resolution can be improved considerably by the use of differential voltmeter or other amplifying means.

Figure 4:
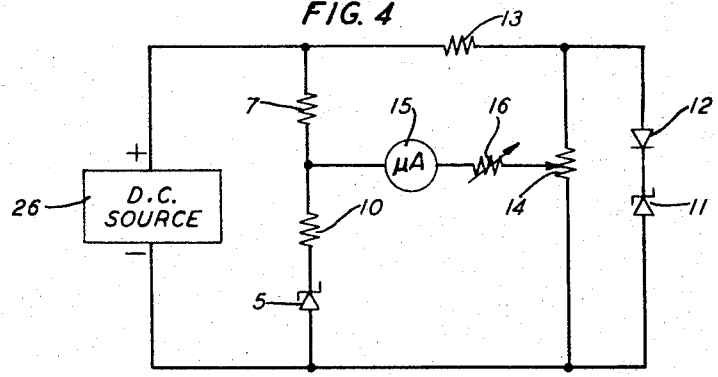
FIG. 4 is a schematic diagram of a particularly advantageous embodiment of the invention.

A particularly useful and advantageous embodiment of the invention is found in the bridge circuit of FIG. 4. This embodiment eliminates the need for a voltage or current regulated supply and expensive metering means. A voltage regulating avalanche breakdown diode 5, commonly called a Zener diode, is connected across a direct current source 26 through two resistors 10 and 7; this diode 5 is the temperature sensing element of the bridge. The magnitude of the voltage source, the total value of resistors 7 and 10, and the polarity of connections to the Zener diode are governed by the same consideration cited for the simple embodiment of FIG. 1 such that the diode operates in the reverse breakdown voltage region. A Zener diode is chosen as the semiconductor junction because it is designed specifically for reverse breakdown voltage operation. The invention is not limited thereto; however, for most semiconductor junctions have similar reverse characteristics although they are not controlled as well during manufacture. To form the reference legs of the bridge two temperature insensitive combinations of Zener diode of 11 and diode 12 may be connected through a resistor 13 across source 26. Any voltage source or voltage regulating device which is stable with temperature may be used for the reference leg, of course, but the mentioned diodes are convenient and inexpensive. Temperature insensitive Zener diode reference elements as produced commercially are a combination of a Zener diode in series with one or more oppositely poled conventional diodes contained in one enclosure. The positive temperature coefficient of the Zener diode in the reverse breakdown voltage range is balanced against the negative coefficients of the diodes operating in the forward bias range to attain minimum sensitivity to temperature variation. However, since the temperature coefficient of reverse breakdown voltage is a function of breakdown voltage and in general changes from negative to positive in the 5-to-6 volt region for silicon, Zener diodes with breakdown voltages of approximately 5.6 volts may be used over limited temperature ranges as temperature insensitive diodes. Enough of these diodes are added in series in the voltage reference leg to cause their total voltage to somewhat exceed that of the temperature sensing diode 5.

If the voltage reference diodes 11 and 12 are subject at all times to the same temperature as the temperature sensing diode 5, they need not have minimum temperature sensitivity as long as the voltage across them changes less with temperature than the voltage across diode 5. On the other hand, if diodes 11 and 12 have virtually zero sensitivity to temperature changes, the equality of temperatures is not a requirement. The value of resistor 13 is chosen in like manner to that of resistor 7 to cause diodes 11 and 12 to operate in the reverse breakdown voltage region with minimum heating. A potentiometer 14 is connected across temperature compensated diodes 11 and 12 for precise adjustment of the required reference voltage. To complete the bridge circuit, a microammeter 15 in series with a variable resistance 16 is connected between the tap on potentiometer 14 and the point between resistors 10 and 7.

Although Zener diodes are voltage regulating devices when operated in the reverse breakdown voltage range, their voltage drop does change several millivolts per each milliampere change of current through them; that is, they have a dynamic resistance of several ohms. In order to make our bridge circuit insensitive to changes in supply voltage, therefore, resistor 10 has been included in the temperature sensing leg so that the change in voltage across that leg due to a given change in supply voltage may be made equal to the change in voltage across the reference leg. The value of resistor 10 is given by the equation:

$$\frac{R_{10}+R_5}{R_7+R_{10}+R_5} = \frac{R_{11}+R_{12}}{R_{13}+R_{11}+R_{12}}$$

where $R_{10}$, $R_7$, and $R_{13}$ are the values of resistors 10, 7, and 13 respectively, and $R_5$, $R_{11}$, and $R_{12}$ are the dynamic resistances of diodes 5, 11, and 12 respectively at their respective operating points. Of course, if $$\frac{R_5}{R_7+R_5} > \frac{R_{11}+R_{12}}{R_{13}+R_{11}+R_{12}}$$

resistor 10 is included in the voltage reference leg instead. The proper value may easily be chosen experimentally, however, by the substitution of resistors for resistor 10 until a 10 percent change in supply voltage produces no readable change on meter 15.

Now since the voltage across the reference leg is essentially constant with temperature, and the voltage across diode 5 is a linear function of temperature, the linear scale of meter 15 is easily calibrated at two points. Potentiometer 14 is adjusted to balance the bridge, giving a zero reading at one known low temperature such as 0° C., and variable resistance 16 is adjusted to provide a correct meter reading at a known higher temperature such as 25° C.

It will be recognized, of course, that the above-described embodiment is merely illustrative of the principles of the invention. Many other arrangements may be devised by those skilled in the art without departing from the spirit and scope of the invention.

What is claimed is:

1. A bridge circuit for measuring temperature comprising a first and second input vertex, a first and second output vertex, a conductive first leg having a resistance $R_1$ connected between said first input vertex and said first output vertex, a potentiometer having a tap and first and second terminals, said second terminal connected to said second input vertex, and said tap forming said second output vertex, a conductive second leg having a resistance $R_2$ connected between said first input vertex and said first potentiometer terminal, a temperature sensing third leg comprising a back-biased breakdown diode operating in its breakdown region connected between said second input vertex and said first output vertex, said third leg having a dynamic resistance $R_3$ in said breakdown range, a fourth leg comprising that portion of the potentiometer between the tap and the second terminal, a voltage reference circuit comprising a temperature stable combination of a serially connected forward biased diode and back-biased breakdown diode connected across said potentiometer terminals having a dynamic resistance $R_4$, and a current meter for indicating the temperature of said breakdown diode connected between said first output vertex and said tap, said dynamic resistances being related by the expression:

$$\frac{R_3}{R_1+R_3}=\frac{R_4}{R_2+R_4}$$

References Cited

UNITED STATES PATENTS

| 2,974,279 | 3/1961 | Barry et al. | |
| 3,045,488 | 7/1962 | Jurs et al. | 73—362 XR |
| 3,142,987 | 8/1964 | Dowling et al. | |
| 3,154,947 | 11/1964 | Poshadel et al. | |
| 3,260,115 | 7/1966 | Logan | 73—362 |
| 3,268,739 | 8/1966 | Dickson. | |
| 3,281,656 | 10/1966 | Noble. | |
| 3,299,709 | 1/1967 | O'Sullivan. | |

FOREIGN PATENTS 692,008   8/1964   Canada.

LOUIS R. PRINCE, *Primary Examiner.*

FREDERICK SHOON, *Assistant Examiner.*

U.S. Cl. X.R.

307—310, 318; 323—075